United States Patent [19]

Valenza

[11] Patent Number: 4,902,154
[45] Date of Patent: Feb. 20, 1990

[54] DISPENSING BRUSH WITH BARB MEANS TO RUPTURE MATERIAL PACKET

[76] Inventor: Michael A. Valenza, 737 Glen Rd., Jenkintown, Pa. 19046

[21] Appl. No.: 191,843

[22] Filed: May 2, 1988

Related U.S. Application Data

[63] Continuation of Ser. No. 892,132, Jul. 30, 1986, abandoned.

[51] Int. Cl.$^4$ .................. A46B 11/00; A01K 13/00
[52] U.S. Cl. ...................... 401/132; 119/83; 119/86; 132/113; 132/114; 132/115; 401/28; 401/134; 401/273; 401/280; 401/268
[58] Field of Search ............... 401/176, 28, 132, 134, 401/264, 280, 273, 268; 132/114, 115, 113; 119/85, 86, 83

[56] References Cited

U.S. PATENT DOCUMENTS

| | | | |
|---|---|---|---|
| 565,950 | 8/1896 | Withers | 401/280 |
| 712,530 | 11/1902 | Herfert | 132/115 X |
| 1,434,844 | 11/1922 | Reinholz | 132/113 |
| 1,722,686 | 7/1929 | Soss | 401/280 |
| 1,735,073 | 11/1929 | Carpenter | 401/264 |
| 2,590,413 | 3/1952 | Jardiness | 401/280 X |
| 2,630,594 | 3/1953 | Fisher | 401/280 X |
| 2,771,890 | 11/1956 | Jaberg | 132/115 |
| 2,823,401 | 2/1958 | O'Higgins | 401/280 |
| 3,053,264 | 9/1962 | Breton | 401/176 X |
| 3,248,754 | 5/1966 | De Mario | 401/132 |
| 3,463,170 | 8/1969 | McCullough | 132/113 |
| 3,597,097 | 8/1971 | Kellis | 401/280 X |
| 3,712,748 | 1/1973 | Wilmans | 401/132 X |
| 3,860,348 | 1/1975 | Doyle | 401/132 X |
| 4,121,602 | 10/1978 | Young | 132/113 |
| 4,213,423 | 7/1980 | Bryan et al. | 132/113 X |
| 4,543,913 | 10/1985 | Wilkeson | 401/28 X |

FOREIGN PATENT DOCUMENTS

| | | | |
|---|---|---|---|
| 211282 | 6/1909 | Fed. Rep. of Germany | 132/114 |
| 869247 | 3/1953 | Fed. Rep. of Germany | 132/114 |
| 2607056 | 9/1977 | Fed. Rep. of Germany | 401/264 |
| 301965 | 9/1954 | Switzerland | 132/115 |
| 143123 | 5/1920 | United Kingdom | 401/264 |

*Primary Examiner*—Steven A. Bratlie
*Attorney, Agent, or Firm*—Volpe and Koenig

[57] ABSTRACT

A material dispensing brush, such as a veterinary brush, in which material to be dispensed, such as flea powder, is contained in the brush body and is either automatically or manually releasable through hollow brush bristles.

5 Claims, 3 Drawing Sheets

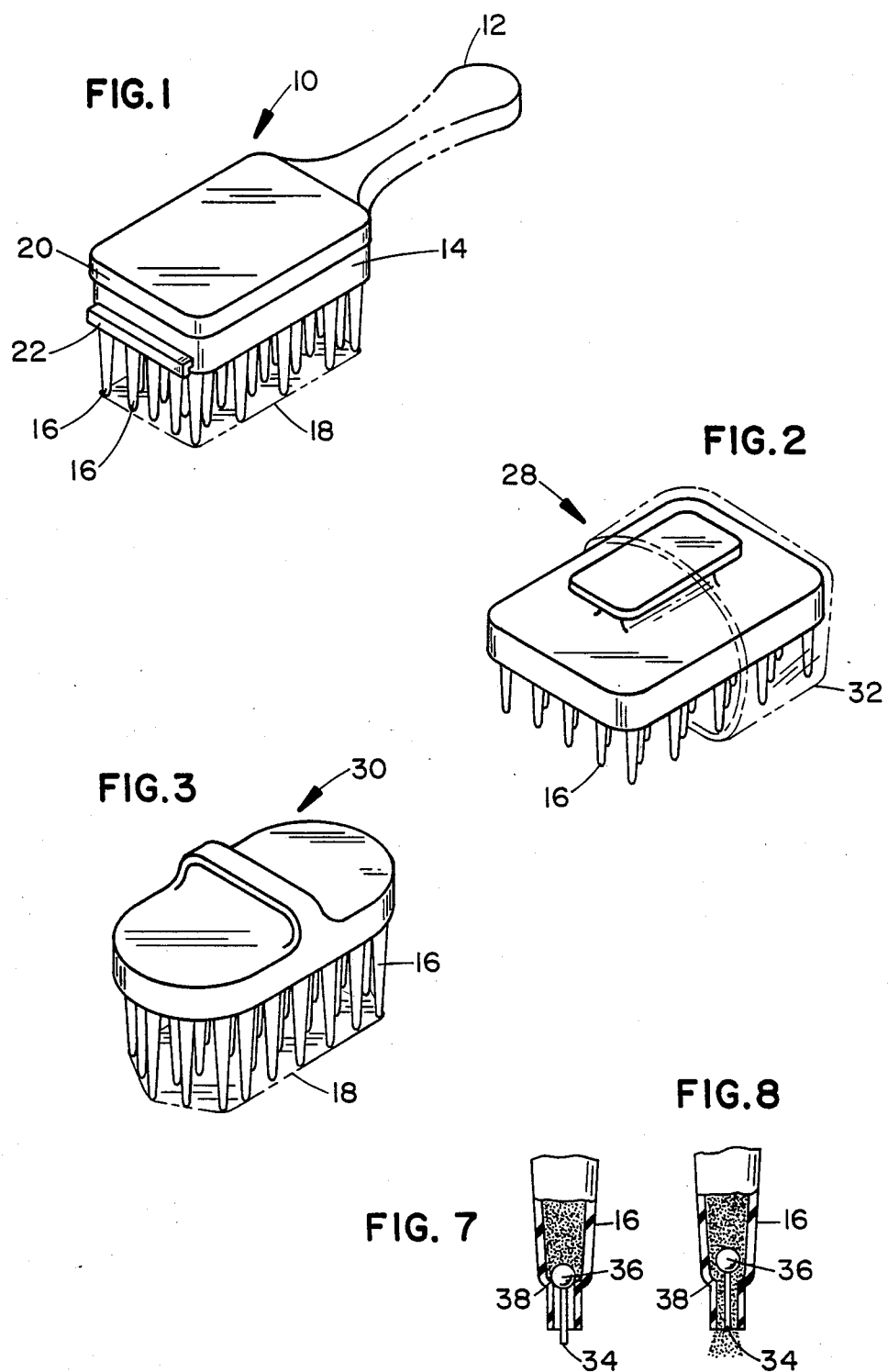

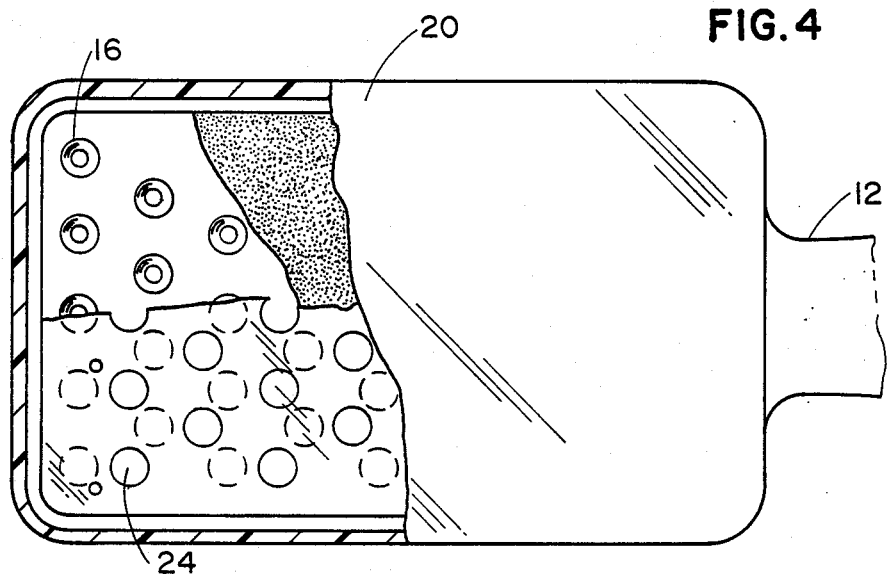
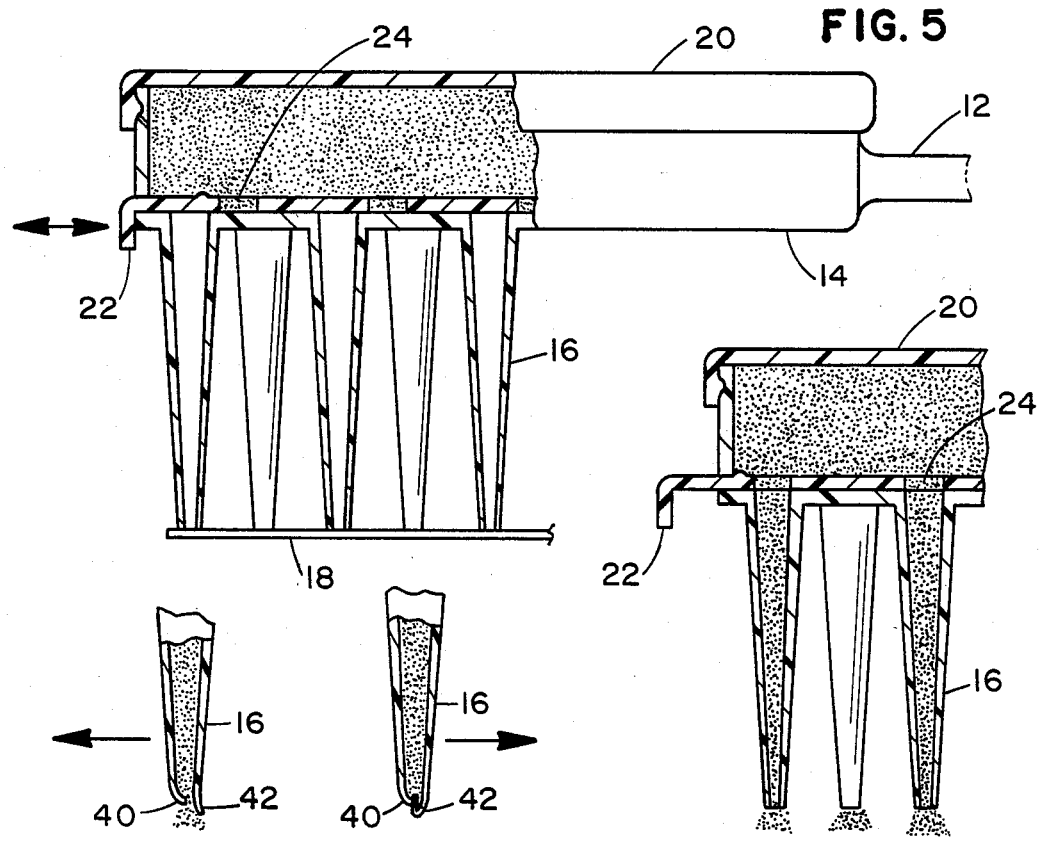

DISPENSING BRUSH WITH BARB MEANS TO RUPTURE MATERIAL PACKET

This is a continuation of application Ser. No. 892,132, filed July 30, 1986 now abandoned.

BACKGROUND OF THE INVENTION

This invention relates to material dispensing apparatus and more particularly to veterinary brushes for dispensing materials such as flea powder.

Existing methods of dispensing veterinary medicines have inherent difficulties. It can be very difficult to evenly distribute a material such as flea powder over an animal's coat. Often excessive material is used which may be both wasteful and injurious to the animal the material is being applied to. Additionally, this process may be slow and cumbersome if the material must first be dispensed and then brushed into an animal's coat.

SUMMARY OF THE INVENTION

It is accordingly an object of the present invention to provide a brush that can dispense material while it is being used for brushing.

It is another object of the present invention to provide a brush that can be refilled once the material to be dispensed is exhausted.

It is a further object of the present invention to provide a brush that can be refilled once the material to be dispensed is exhausted with a packet of material.

It is still another object of the present invention to provide a brush including apparatus for automatically tearing open a packet of material used in the brush.

It is yet a further object of the present invention to provide a brush with apparatus for manually providing or preventing material dispensing.

It is an additional object of the present invention to provide a brush with apparatus for automatically preventing material dispensing when the brush is not in use.

It is still further object of the present invention to provide a brush for automatically providing material dispensing when the brush is in use.

It is a further object of the present invention to provide a brush with apparatus for automatically assisting dispensing of material by agitating the material during brushing.

It is yet a further object of the present invention to provide a brush with apparatus for automatically dispensing material when the brush is used in a predetermined brushing direction.

It is yet another object of the present invention to provide a brush with apparatus for automatically preventing material dispensing when the brush is used in a predetermined brushing direction.

It is a still further object of the present invention to provide a disposable brush with material to be dispensed contained in the body of the brush.

The present invention overcomes the disadvantages of dispensing materials such as veterinary medicines. In contrast to existing approaches to dispensing such materials, the present invention provides a brush containing the material to be dispensed in the brush body which is dispensable via hollow brush bristles. The brush user can then dispense the material evenly and neatly without material waste during the brushing operation.

In general, the invention features a material dispensing brush including a brush body having a hollow for holding a material to be dispensed and hollow brush bristles attached to the brush body that define a hollow core extending from the hollow for holding a material to be dispensed to the bristle ends furthest from the brush body.

In preferred embodiments, the material to be dispensed is either a powder or a liquid. The brush further includes apparatus for controlling release of the material held in the brush body from the bristles. The apparatus for controlling release of the material held in the brush body is either a break away sheet attached to the bristle ends furthest from the brush body or it is a continuous enclosure surrounding the brush. The apparatus for controlling release of the material held in the brush body is a slidable member movable between a first fully opened position and a second fully closed position for selectively releasing the material. The member defines passages arranged so that the passages correspond with the hollow cores of the bristles when the member is in its first position providing a continuous passage from the hollow of the brush body to the hollow cores of the bristles. The member passages do not correspond with the hollow cores of the bristles when the member is in its second position, so that the member in the second position interrupts the continuous passage from the hollow of the brush body to the hollow cores of the bristles.

In other preferred embodiments, the brush body further includes apparatus for permitting the refilling of the brush body with the material to be dispensed. The apparatus for permitting refilling of the brush body includes a selectively openable cover attached to the brush body. The apparatus for permitting refilling of the brush body further includes a sealed material packet that is introducible into the brush body by opening the selectively openable cover, and apparatus for puncturing the packet to release the material in the packet. The apparatus for puncturing the packet includes a slidable member for controllably releasing material from the hollow of the brush body to the hollow core of the bristles. The member includes upwardly protruding projections capable of tearing the sealed material packet when the member is moved from a first position interrupting material release from the brush body hollow to the hollow core of the bristles to a position releasing material from the brush body hollow to the hollow core of the brush bristles.

In still other preferred embodiments, the brush bristles further include apparatus, located at the bristle ends farthest from the brush body, for automatically assisting flow of the material from the bristle ends when the brush is used for brushing and for automatically retarding the material flow when the brush is not used for brushing. The apparatus for automatically assisting and retarding material flow includes a ball and rod assembly, in which the ball is seated on an internally protruding collar of the bristle to retard material flow from the bristle when the brush is not in use, and the rod affixed to the ball extends from the bristle end when the ball is seated and is capable of receding into the bristle end an unseating the ball from the collar when the bristle end contacts the surface to be brushed. The brush bristles include apparatus for releasing material from the bristle ends when the brush is moved in a first brushing direction and for retarding material release from the bristle ends when the brush is moved in a second brushing direction. The apparatus for retarding and releasing the material from the bristle ends includes a flap responsive to the motion of the brush. The flap free end being moved away from the bristle longitudinal axis when the brush is moved in the first brushing direction and the flap free end being moved toward the bristle longitudinal axis when the brush is moved in the second brushing direction.

Other features and advantages of the invention will be apparent from the follow detailed description of the preferred embodiments and from the claims.

For a full understanding of the present invention, reference should now be made to the following description and to the accompanying drawings.

BRIEF DESCRIPTION OF THE DRAWINGS

FIG. 1 is a perspective view of a preferred embodiment of the invention.

FIG. 2 is perspective view of an alternate embodiment of the invention.

FIG. 3 is perspective view of another alternate embodiment of the invention.

FIG. 4 is a partially cut away, partial top view of the invention shown in FIG. 1 showing the interior of the brush body.

FIG. 5 is a partial right side elevation view, partially in cross section, of the invention shown in FIG. 1 showing the material dispensing apparatus in a closed position.

FIG. 6 is a partial cross sectional view of the invention shown in FIG. 1 showing the material dispensing apparatus in an open position.

FIG. 7 is a cross sectional view of an alternate embodiment of a brush bristle with material dispensing apparatus shown in a closed position.

FIG. 8 is a cross sectional view of the alternate embodiment shown in FIG. 7 with the material dispensing apparatus shown in an open position.

FIG. 9 is a cross sectional view of another alternate embodiment of a brush bristle with the material dispensing apparatus shown in an open position.

FIG. 10 is a cross sectional view of the alternate embodiment shown in FIG. 9 with the material dispensing apparatus shown in a closed position.

DETAILED DESCRIPTION OF THE PREFERRED EMBODIMENTS

Figure 11:
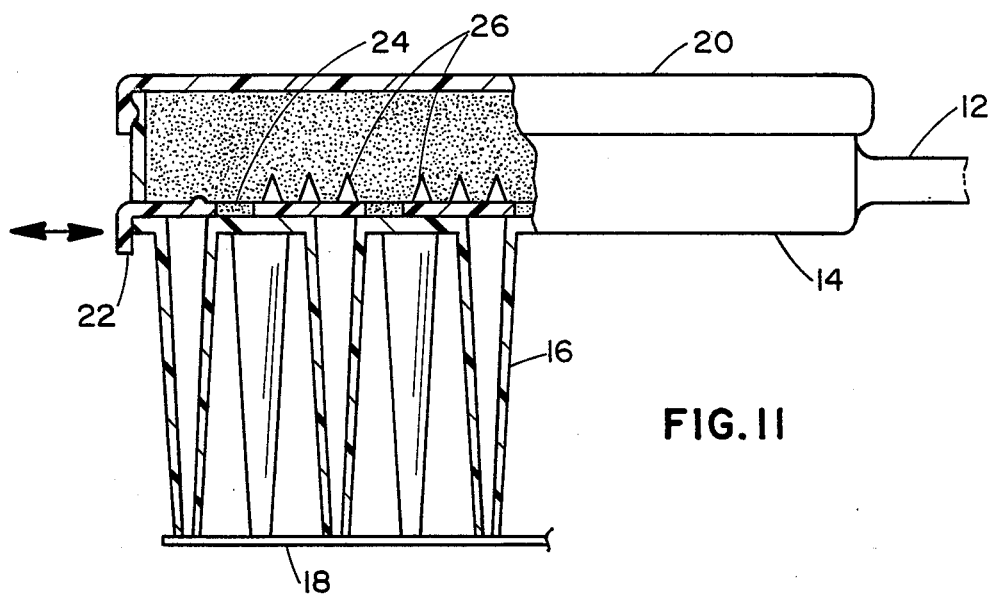
FIG. 11 is an alternate embodiment of the invention shown in FIG. 5, having apparatus for automatically opening a packet of material to be dispensed.

Referring to FIG. 1, there is shown a perspective view of a preferred embodiment of the invention, generally designated 10. Brush 10 includes a handle 12 affixed to hollow brush body 14 and hollow bristles 16 attached to the brush body. The hollow bristles are typically constructed of molded polypropylene to insure flexibility and to allow bristles with different size openings to be easily produced. Variations in the bristle openings will be required dependent upon the particular material being dispensed. Sheet 18 (also shown in FIG. 5), typically constructed of foil or mylar, is attached to bristles 16 to close their open ends. Cover 20 is connected to the top of brush body 14 and is removable to expos the hollow interior of the brush body. Slidable member 22 moves parallel to the longitudinal axis of brush 10 and depending on its position it either allows a continuous opening between the hollow interior of brush body 14 and hollow bristles 16 or it closes the opening between the brush body and the bristles.

Referring to FIGS. 4, 5 and 6, slidable member 22 is shown in more detailed. Member 22 includes holes 24 which can be aligned with hollow bristles 16, as shown in FIG. 6, to provide a continuous open path between the bristles and the hollow interior of brush body 14. Alternatively, member 22 can be shifted, as shown in FIG. 5, so holes 24 are non-aligned with hollow bristles 16 and the interior of brush body 14 is closed off from the bristles. As can be seen from FIGS. 4, 5, and 6, there are a plurality of holes or apertures 24. Each aperture 24 corresponds to a respective bristle 16. The bristles 16 are arrayed in a plurality of rows beneath the lower surface of brush body 14 and are all of substantially the same length.

The operation of the invention will now be described with reference to FIGS. 1, 4, 5 and 6. Cover 20 is opened and a material to be dispensed, such as flea powder, is placed in hollow brush body 14. Cover 20 is then closed and the material to be dispensed is held inside brush body 14 as long as slidable member 22 is in the non-aligned or closed position as shown in FIG. 5. Flexible sheet 18 is then permanently removed from the bristles before brush use. This sheet prevents foreign matter from entering the hollow bristles during shipping and prevents any leakage of material to be dispensed in the event the brush is delivered for sale already containing a material to be dispensed.

The brush can be used as an ordinary veterinary brush when member 22 is in its closed position. However, moving slidable member 22 to its open position, as shown in FIG. 6, permits the material in the interior of brush body 14 to flow into hollow bristles 16. The material is then automatically placed on the animal being brushed by ordinary brushing action. When enough material has been dispensed onto the animal slidable member 22 is moved to its closed position (shown in FIG. 5) and the flow of material into the hollow bristles is blocked. Also, placing member 22 in its closed position allows storage of brush 10 without leakage of the material contained in the hollow interior of brush body 14.

When the material to be dispensed is used up cover 20 can be opened and brush body 14 can be refilled. Loose material can be introduced into brush body 14 or material enclosed in a packet or pouch made of a flexible material such as foil or plastic can be inserted in the interior of body 14. The packet can be torn opened upon insertion by the brush user or in an alternate embodiment, shown in FIG. 11, barbs 26 project upward from slidable member 22 and tear open the packet when member 22 is moved from its closed to its opened position.

In another preferred embodiment of the invention the brush can be a disposable brush with the material to be dispensed sealed in the brush body. Once the material to be dispensed is exhausted the brush is discarded or retained for use as an ordinary veterinary brush. Referring to FIGS. 2 and 3 disposable brushes 28 and 30 are shown. Brush 28 is enclosed in shrink-wrap plastic 32 and brush 30 has sheet 18 attached to the bristle ends to prevent leakage of the material to be dispensed prior to initial use.

Alternatively, brushes 28 and 30 could have hollow bristles with closed molded tips such as used on a cartridge containing caulking o grease. The bristles could then be opened when brush use is desired by cutting the bristle ends on a bias so material flow from the brush body could be started.

In another preferred embodiment apparatus for controlling the flow of material from hollow bristles 16 is located inside the bristle ends. Referring to FIGS. 7 and 8, such apparatus comprising a rod 34 attached to a ball 36 is shown. When the brush is not in use, as shown in FIG. 7, ball 36 is seated on collar 38 of hollow bristle 16 blocking the flow of material to the bristle. When the brush is used and the bristle end comes in contact with the surface to be brushed rod 34 is pushed into hollow bristle 16 unseating ball 36 from collar 38, as shown in FIG. 8. This action allows material to flow from the end of bristle 16 and actually assists in this flow due to the agitating action of ball 36 when it is pushed up into hollow bristle 16 during normal brushing motions.

In another preferred embodiment, shown in FIGS. 9 and 10, bristle ends are constructed so they only release material when the brush is moved in a predetermined brushing direction. In this embodiment the bristle ends comprise rigid flap 40 and slightly longer flexible flap 42. Referring to FIG. 10, when the brush is moved in the direction of the arrow flexible flap 42 is pushed against rigid flap 40 closing the bristle end so material flow from the bristle is blocked. When the brush direction is reversed, as shown in FIG. 9, flexible flap 42 is pulled away from rigid flap 40 allowing material to flow from the bristle end.

There has thus been shown and described a novel material dispensing brush which fulfills all the objects and advantages sought. Many changes, modifications, variations, and other uses and applications of the subject invention, will, however, become apparent to those skilled in the art after considering the specification and the accompanying drawings which disclose preferred embodiments thereof. All such changes, modifications, variations and other uses and applications within the spirit and scope of the invention are deemed to be covered by the invention which is limited only by the claims which follow.

I claim:

1. A material dispensing brush for receiving, opening and dispensing material from a material packet, said brush comprised essentially of:
    a molded body portion defining a material holding hollow for receiving said material packet, said body portion having a slot in one end thereof adjacent to the inner lower surface of said hollow and a plurality of integrally molded, flexible, bristles which are arrayed in a plurality of rows adjacent the outer lower surface of said hollow with at least some of said plurality of bristles being hollow core bristles having a first end in direct communication with the hollow, a second end for dispensing material and a hollow core providing a passage way for directing material from said hollow to the second material dispensing end of the respective hollow core bristle;
    a sliding material release control means, including a plurality of barbs which project upwardly therefrom to engage and open said packet, extending through said slot in said body portion, said means having a plurality of apertures therein which are equal in number to said hollow core bristles, each of said apertures positioned to communicate with a respective hollow core bristle and to provide a continuous passage from said hollow to said material dispensing end of the hollow core bristle in a first position and to interrupt said continuous passage in a second position.

2. The brush of claim 1 further including a cover which is secured to said body portion.

3. The brush of claim 1 wherein said body portion and said bristles are molded as an integral unit.

4. The brush of claim 1 wherein said brush bristles further comprise means for assisting flow of said material from said material dispensing ends when said brush is used in a first direction and for retarding said material flow from said material dispensing ends when said brush is used in a second opposite direction.

5. The combination of a material containing packet and a material dispensing brush said combination comprised essentially of:
    a packet of material to be dispensed; and
    a brush having:
        a molded body portion defining a material packet holding hollow for receiving said packet of material, said body portion having a slot in one end thereof adjacent to the inner lower surface of said hollow and a plurality of integrally molded bristles which are arrayed in a plurality of rows adjacent the outer lower surface of said hollow, each of said bristles is a flexible, hollow core bristle with a first end, in direction communication with the hollow, and a second material dispensing end, each of said bristles provides a passage way for directing material from said hollow to the second material dispensing end of the respective bristle; and
        a sliding material release control means, extending through said slot in said body portion, said means having a plurality of apertures therein which are equal in number to said plurality of bristles, each of said apertures positioned to communicate with a respective bristle and to provide a continuous passage from said hollow to said material dispensing end of the bristle in a first position and to interrupt said continuous passage in a second position, said control means further including a plurality of packet opening barbs which project upwardly therefrom and contact the material packet whereby the packet is opened and the material released as said sliding control release means is moved between said first and second positions.

* * * * *

UNITED STATES PATENT AND TRADEMARK OFFICE
CERTIFICATE OF CORRECTION

PATENT NO. : 4,902,154
DATED : February 20, 1990
INVENTOR(S) : Michael A. Valenza It is certified that error appears in the above-identified patent and that said Letters Patent is hereby corrected as shown below:

Column 1, line 40, after the word "is" and before the word "still" insert --a--.

Column 2, line 59, delete the word "an" and insert therefor --and--.

Column 3, line 60, delete the word "expos" and insert therefor --expose--.

Claim 5, column 6, line 22, after the word "brush" and before the word "said" insert a --,-- .

Claim 5, column 6, line 34, delete the word "direction" and insert therefor --direct--.

Signed and Sealed this

Twenty-second Day of January, 1991

Attest:

HARRY F. MANBECK, JR.

Attesting Officer     Commissioner of Patents and Trademarks